United States Patent [19]

Johnston

[11] Patent Number: 4,664,427
[45] Date of Patent: May 12, 1987

[54] QUICK CONNECT FITTING

[75] Inventor: Robert L. Johnston, Greenville, Ohio

[73] Assignee: Master Industries, Inc., Ansonia, Ohio

[21] Appl. No.: 718,563

[22] Filed: Apr. 1, 1985

[51] Int. Cl.⁴ .............................................. F16L 17/00
[52] U.S. Cl. .................................... 285/340; 285/270; 285/334.2; 285/402; 285/921
[58] Field of Search ............... 285/231, 232, 261, 266, 285/178, 270, 271, 340, 341, 334.2, 334.3, DIG. 3, DIG. 22, 223, 342, 343

[56] References Cited

U.S. PATENT DOCUMENTS

| | | | |
|---|---|---|---|
| 2,413,840 | 1/1947 | Mercier | 285/342 |
| 2,556,659 | 6/1951 | Patterson | 285/261 |
| 3,103,373 | 9/1963 | Lennon et al. | 285/342 |
| 3,180,664 | 4/1965 | Franck | 285/343 |
| 3,738,688 | 6/1973 | Racine | 285/341 |
| 3,951,418 | 4/1976 | Dryer | 285/271 |
| 4,009,720 | 3/1971 | Crandall | 285/334.2 |
| 4,123,090 | 10/1978 | Kotsakis et al. | 285/340 |
| 4,225,162 | 9/1980 | Dola | 285/DIG. 22 |
| 4,522,433 | 6/1985 | Valentine et al. | 285/261 |

FOREIGN PATENT DOCUMENTS

| | | | |
|---|---|---|---|
| 858049 | 12/1952 | Fed. Rep. of Germany | 285/261 |
| 2750547 | 9/1978 | Fed. Rep. of Germany | 285/340 |
| 912514 | 12/1962 | United Kingdom | 285/DIG. 22 |

Primary Examiner—Cornelius J. Husar
Assistant Examiner—Anthony Knight
Attorney, Agent, or Firm—Barnes, Kisselle, Raisch, Choate, Whittemore & Hulbert

[57] ABSTRACT

A quick connect fitting for tubing which can be inserted into a pre-assembled fitting where it will become sealed and locked against pull-out. A main fitting body has an open-ended recess in which is located a movable piston to seal against the body and an inserted tube. The piston wedges over a conical extension on a sealing gland retained by a snap-on cap, the gland and the cap having complemental spherical surfaces to allow swivel movement of the tube without disturbing the seal in the tube. A locking ring retainer grabs the tube annularly and bears against the piston to resist pull-out.

18 Claims, 9 Drawing Figures

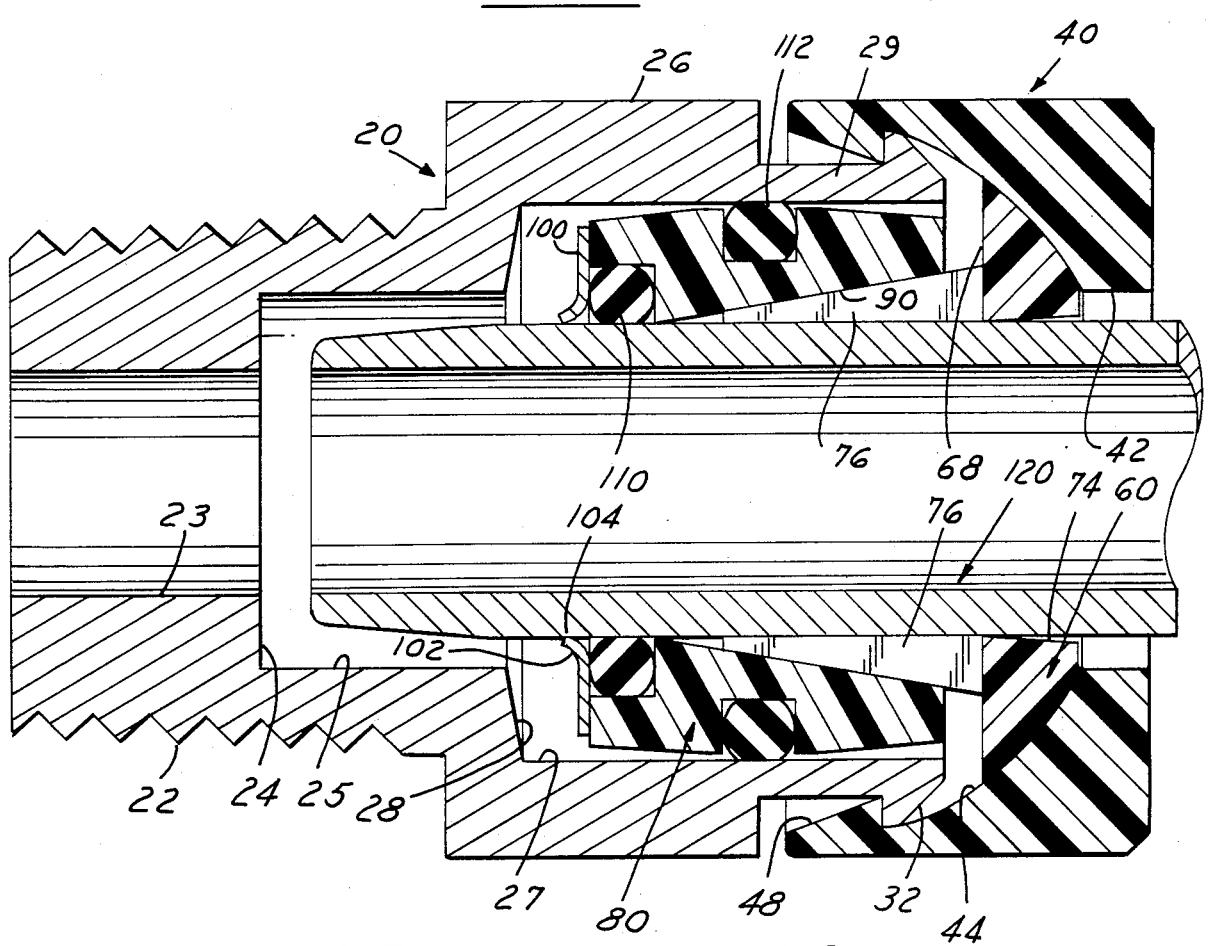
FIG. 1
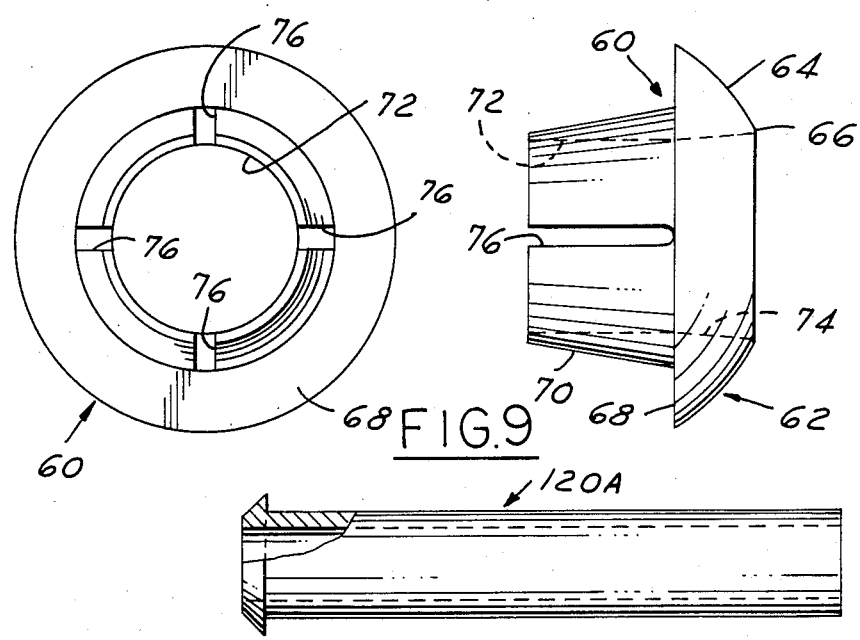
FIG. 3
FIG. 2
FIG. 9

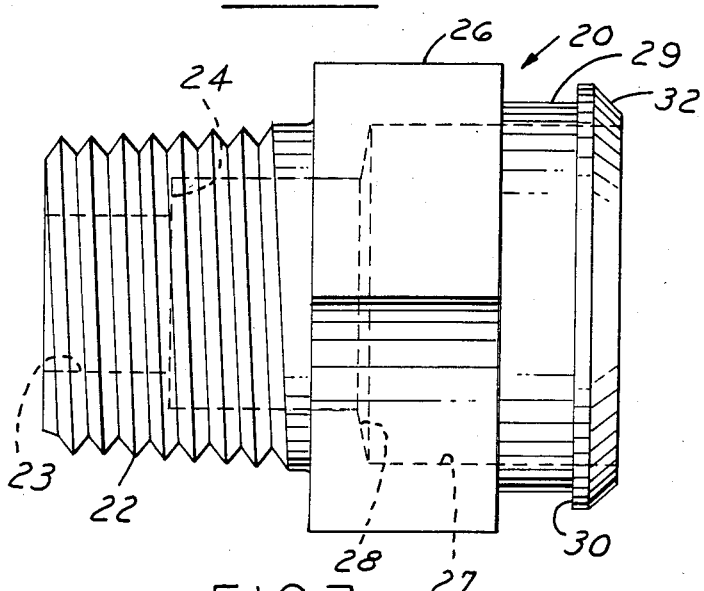
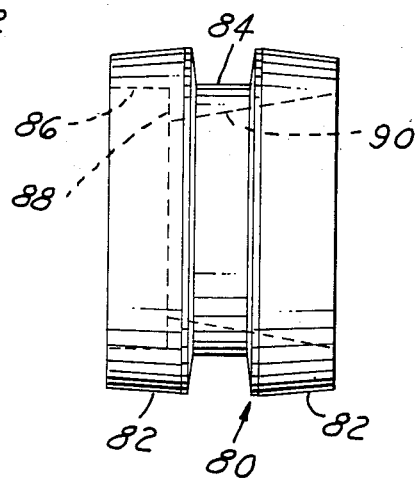
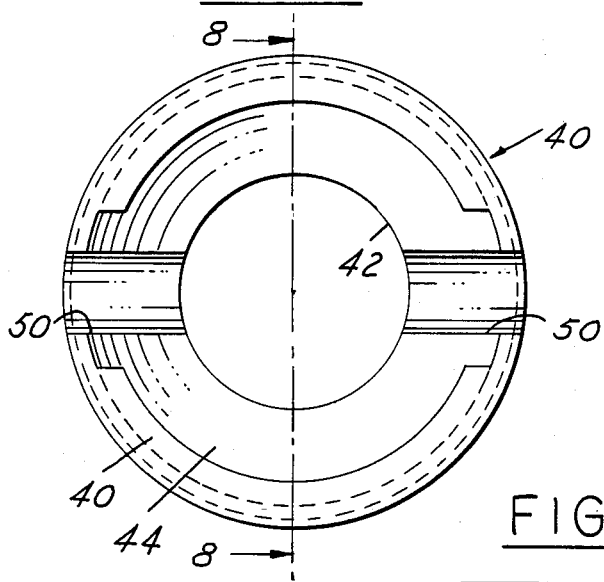
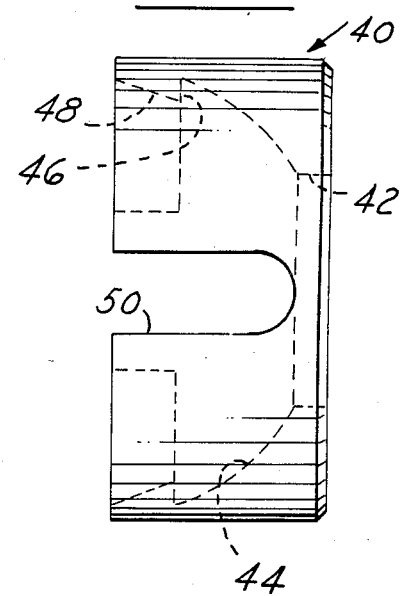
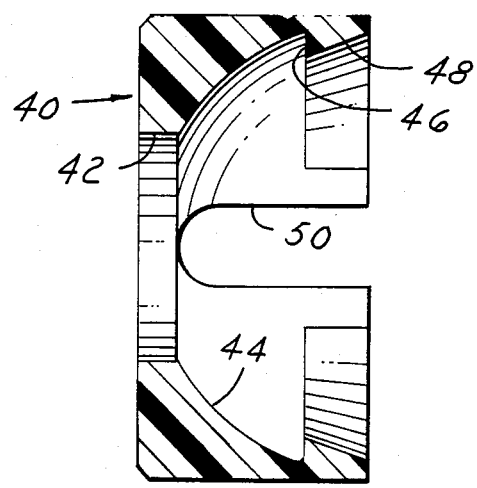

QUICK CONNECT FITTING

FIELD OF INVENTION

Connections for tubing wherein the end of a tubing may be pushed into a threaded connector fitting and securely retained against withdrawal, thus facilitating a quick connection for tubing into a position of utility for pneumatic or hydraulic systems.

BACKGROUND OF THE INVENTION

There are many uses for pneumatic or hydraulic tubing in machine tools, automotive vehicles and numerous other applications. In many installations, it is desirable to be able to connect the tubing quickly and effectively. When it is necessary to use wrenches or other tools to make the connections, much time is lost and tight joints may not always result unless the involved workman is acting with skill and care.

In the installation of the tubing in assembly lines, such as tubing for automotive transmissions, cooling systems and heaters, speed of installation and quality is essential. it is an object of the present invention to provide a connector fitting assembly into which the end of tubing can be inserted and pushed in where it will instantly be held against withdrawal and sealed against leakage.

A further object is the provision of a tube fitting which will allow tube rotation and a limited angular movement without disturbing the seal and also a structure which will seal more tightly as pressure increases.

It is a further object to provide a tube fitting for push-in connection which can be released by proper manipulation of one of the elements without damage to the tubing.

Other objects of the invention will be apparent in the following description and claims in which the invention is described together with details to enable persons skilled in the art to practice the invention all in connection with the best mode presently contemplated for the practice of the invention.

BRIEF DESCRIPTION OF THE DRAWINGS

Drawings accompany the disclosure and the various views thereof may be briefly described as:

FIG. 1, a longitudinal section of a connector fitting and tube;

FIG. 2, a side elevation of a locking wedge element of the fitting;

FIG. 3, an end view of the locking wedge element;

FIG. 4, a side elevation of a body element of the fitting;

FIG. 5, a side elevation of a sleeve piston element of the fitting;

FIG. 6, a side elevation of an end retainer cap unit for the fitting;

FIG. 7, an end view of the end cap of FIG. 6.

FIG. 8, a sectional view of the end cap unit.

FIG. 9, a view of an anvil insert for soft tubing.

DETAILED DESCRIPTION OF THE INVENTION AND THE MANNER AND PROCESS OF USING IT

With reference to the drawings, the assembly drawing in FIGS. 1 and 4 show a body element 20 for the fitting which includes an externally threaded neck portion 22 having a passage 23, a shoulder 24, a stepped recess 25, and an enlarged portion 26 with a hexagonal outer surface and a cylindrical inner recess 27. A shoulder 28 is formed with a 9° taper between recesses 25 and 27. A cylindrical extension 29 enlarges at a shoulder 30 to a flange which has a chamfer 32 at the end. This body portion 20 may be formed of metal or a dense plastic.

A snap-on retainer cap 40, FIGS. 1 and 6 to 8, has a body portion with a tube opening 42 which opens to a spherical recess 44 terminating at its largest diameter in a shoulder 46. The inner diameter of the shoulder 46 flares outward at 48. Diametrically opposed notches 50 allow flexing of the periphery of the retainer cap in assembly and disassembly. This retainer cap 40 is preferably molded from a plastic material having a form retaining characteristic but sufficient flexibility to yield for snap-on assembly and pry-off disassembly.

A third element of the assembly is a locking wedge and sealing gland 60 illustrated in section in FIG. 1. A side view and an end view are illustrated respectively in FIGS. 2 and 3. This element 60 has an end portion 62 shaped as a segment of a sphere with a spherical surface 64 truncated at one end 66 and forming, at its larger diameter, a shoulder 68 in a plane transverse to the axis of the part.

From the shoulder 68 a tapered portion 70 extends axially. A tube passage 72 is formed in the portion 70, this passage tapering outwardly at 74 at about a 2° angle. The extended portion 70 is provided with four axial slots to allow this portion to squeeze down on a retainer tube as will be described. This part 62 may also be molded of plastic.

A fourth element of the assembly is again a molded plastic part which may be termed a sleeve piston 80 illustrated in section in FIG. 1 and in elevation in FIG. 5. This part is formed as two frusto-conical parts 82 back to back and separated by an O-ring groove 84 for an O-ring 112. The walls of the cones are at about 5° to the axis for the purpose to be explained below. A cylindrical recess 86 at one end terminates in a shoulder 88 at the inner end of which originates a tapered recess 90 terminating at the other end. The recess 86 is provided to receive an O-ring 110 and the tapered recess 90 is provided to complement and receive the tapered end 70 of part 62. In function, sleeve 80 is formed of a plastic material which may expand circumferentially when cammed outwardly by the related tapered portions.

A fifth element of the assembly comprises a closed metallic retainer ring 100 shown in section in FIG. 1. This ring has an out-turned lip 102 with a sharp corner 104 which will "grab" the surface of an inserted tube and prevent withdrawal.

Turning now to the assembly drawing in FIG. 1, the elements 20, 40, 60, 80 and 100 may all be pre-assembled. O-rings 110 and 112 are pre-assembled on the sleeve piston 80 as shown and the retainer ring 100 and sleeve piston are moved into the recess 27 of the body 20. The tapered end 70 of the spherically capped locking wedge 60 is then inserted into the tapered recess 90 of the sleeve piston 80. If desired, the part 60 can be pre-assembled into the sleeve piston 80. The snap-on cap 40 is then pushed onto the body 20 so that the tapered opening 48 cams over the tapered end 32 and the shoulders 30 and 46 engage to prevent withdrawal. The parts as described may be readily assembled by hand.

When the assembled parts are together as viewed in FIG. 1, a tube 120 may be thrust into the opening 72, 74 of the wedge element 60 and through the O-ring 110 in sleeve piston 80. The tube should have smooth corners to avoid marring the O-ring 110. The tube will then feed through the hole in the retainer 100 and further insertion will be blocked by shoulder 24. The inclined shoulder 28 will be contacted by the ring 100 and this will tend to open up the ring somewhat during the insertion of the tube. Any type of tubing, metal, plastic, rubber, etc. may be used but it should be free of sharp edges on the end that is to be inserted and have a reasonably smooth surface. Once the tube is inserted, it is sealed by O-ring 110 and locked in place by ring 100. During insertion ring 100 may abut the tapered shoulder 28 as above described. Any withdrawal of the tube will bring ring 100 into contact with the sleeve piston which when forced back will cam up on the tapered end 70 of the capped wedge 60 to tighten the parts and force the complementary spherical surfaces 44 and 64 into tight contact.

Also, pneumatic or hydraulic pressure will act on the sleeve piston to tighten the parts in the same manner as a tube pull back. The slight tapered in opening 74 of the part 60 and the conical shape of the sleeve piston, as well as the spherical surfaces, allows the tubing to deviate 5° in any direction for misalignment stress and vibration absorption in the fitting. In other words, there is a swivel joint to a limited degree. Also, the O-ring seal 112 is a dynamic seal in the sense that the tube may move angularly and also the tube may rotate with related parts.

Thus, there is provided a push-in type of connector which facilitates quick assembly on an assembly line, for example, with no need for tools. When a tension is applied to the tubing or internal pressure is present, the glands (sleeve piston 80 and the O-ring 112 and the part 60) will close around the piston creating a friction grip on hard tubing and a compression on a soft tubing. Any pulling or pressure will cause the spherical element 60 to be tightened around the tube by the spherical surface 62 and the taper of parts 60 and 80. These forces will also force O-ring 112 against the wall of recess 27 and move O-ring 110 tighter against the tube.

When soft tubing is utilized, a stiffener anvil insert 120A, shown in FIG. 9, is utilized in the end of the tubing prior to insertion into the connector fitting.

The ring 100 is loose in the assembly prior to the introduction of the tube, but the tube end will find the opening in the ring and back it against the tapered shoulder as the tube is pushed through the ring.

It will be appreciated that the tube, once inserted, cannot be withdrawn without destroying the locked end. However, the end cap 40 can be removed by spreading the sides opposite the slots 50 to detach the snap-in shoulders 30, 46 and allow removal. Parts 60 and 80 can then be withdrawn and the lock ring 100 remoed. The tube can then be reused by installing a new lock ring and proceeding as before.

What I claim is:

1. A quick connect fitting assembly for tubes into which a tube can be pushed and locked and sealed comprising:
   (a) a main fitting body having a utility connection means at one end and an open-ended cylindrical recess at the other end,
   (b) a sleeve piston in said recess in external sealing relating to said recess and an internal sealing relation to an inserted tube, said piston having an internal concial recess facing the open end of said cylindrical recess,
   (c) a locking sleeve in said recess in axial alignment with said piston and having an external conical portion arranged and disposed to penetrate into said internal conical recess of said piston and further having a segmental spherical portion with an external spherical surface opposite said external conical portion,
   (d) retainer means engageable with said main fitting body having an internal spherical surface complemental to and engageable with said external spherical surface of said locking sleeve, and
   (e) wherein said piston, said locking sleeve and said internal and said external spherical surfaces are arranged and are dimensioned to provide a swivel joint for limited deviations of said tube from coaxial alignment with said recess.

2. A quick connect fitting for tubes as defined in claim 1 wherein said retainer means is a cap and said main fitting body and said retaining cap have opposed circumferentially extending shoulders to engage in a snap over connection.

3. A quick connect fitting for tubes as defined in claim 2 in which said sleeve piston has an annular internal recess at one end and an annular external recess essentially central of the length of said sleeve and an O-ring seal in each internal and external recess.

4. A quick connect fitting for tubes as defined in claim 1 in which said sleeve piston is formed externally as a double frusto-cone tapering from a large diameter centrally of said piston to a smaller diameter at the ends.

5. A quick connect fitting for tubes as defined in claim 1 in which said external conical portion of said locking sleeve is slotted axially.

6. A quick connect fitting for tubes as defined in claim 1 in which a locking ring is positioned in said open-ended recess in said main fitting body between a radial shoulder in said body and the inner end of said sleeve piston, said ring having an annular internal edge to lock into the surface of an inserted tube.

7. A quick connect fitting for tubes as defined in claim 6 in which said radial shoulder in said body is tapered away from the open end of said body to provide a tapered back-up shoulder for said locking ring during insertion of a tube into said fitting assembly.

8. A quick connect tube fitting having a main body provided with a through bore having one end opening outwardly to receive a free end of the tube when the tube is inserted in a first direction into the body and means to inhibit withdrawal of the tube in an opposite direction out of the body including first and second locking means, said first locking means comprising a locking ring carried in said bore to receive said free end of the tube when it is inserted in a first direction into the bore and lock onto said free end and means for interengaging said lock ring with said fitting body, said second locking means comprising a sleeve piston and a wedge lock sleeve carried in said bore in coaxial alignment, said piston having external sealing means to seal against the body, internal sealing means to seal on said free end of said tube and first cam means at an end thereof facing toward said open end that receives said tube, said wedge lock sleeve having second cam means at one end facing toward and being generally complementary to said first cam means on said piston, and wherein said second locking means further comprises means interengaging said body with said wedge lock sleeve so that when said sleeve piston and said wedge lock sleeve ar axially engaged with each other said wedge lock sleeve is cammed radially inwardly into locking engagement with said free end of said tube.

9. The quick connect fitting set forth in claim 8 wherein said sleeve piston is arranged and disposed in said bore so as to be axially shiftable in said opposite direction to cam said wedge lock sleeve into locking engagement with said free end of said tube, said locking ring is disposed in said bore remote from said open end thereof and adjacent an end of said sleeve piston opposite the cam end thereof so that said locking ring after locking onto said tube is shiftable in said opposite direction into engagement with said piston to in turn shift said piston in said opposite direction.

10. The quick connect fitting set forth in claim 9 wherein said piston is arranged and disposed in said bore so as to be axially shifted in said opposite direction when said fitting is pressurized.

11. The quick connect fitting set forth in claim 9 wherein said locking ring and fitting body interengaging means includes said piston and said sleeve.

12. The quick connect fitting set forth in claim 8 wherein said piston is arranged and disposed in said bore so as to be axially shifted in said opposite direction when said fitting is pressurized.

13. The quick connect fitting set forth in claim 8 wherein said wedge lock sleeve and body interengaging means comprises a spherical surface on said wedge lock sleeve facing generally toward said open end of said bore and retainer means engageable with said body and projecting radially inwardly so as to partially close said open end of said bore, said retainer means having an internal spherical surface facing generally inwardly of said bore and being complemental to said spherical surface on said wedge lock sleeve.

14. The method of quick connecting a tube in a fitting wherein the fitting has a bore therein open at one end to receive said tube, a locking ring carried in said bore and sealing and locking means to seal the space between the bore and a free end of the tube inserted into the bore in a first direction and to lock the tube in the bore, said sealing and locking means comprising a piston and a radially compressible sleeve, said piston and said sleeve having complementary interengaged camming means to compress the sleeve into tight engagement with the tube when the piston is shifted in a direction opposite said first direction, said method comprising the steps of pushing a free end of the tube into said fitting and through said sleeve, said piston and said locking ring to lock the locking ring onto the free end of the tube engaging said locking ring with said body to inhibit withdrawal of the free end from the fitting in said opposite direction and then shifting said piston in said opposite direction to compress said sleeve onto the tube while interengaging said sleeve and said body so as to achieve a double locking arrangement of said tube in said fitting.

15. The method set forth in claim 14 wherein said piston is shifted axially by pulling the tube in said opposite direction to engage said locking ring with said piston.

16. The method set forth in claim 14 wherein said piston is shifted axially by pressure against the end thereof when said fitting is pressurized.

17. The method set forth in claim 14 wherein said piston is shifted by pressurizing said fitting.

18. A quick connect fitting assembly for tubes into which a tube can be pushed and locked and sealed comprising:
(a) a main fitting body having a utility connection means at one end and an open ended cylindrical recess at the other end,
(b) retainer means engageable on said maind body and projecting radially inwardly of said recess so as to partially close said open end of said recess and provide an opening through which said tube can be inserted in a first direction into said recess, said retainer means having an internal spherical surfcae facing generally inwardly of said recess,
(c) a sleeve piston in said recess and having an externally mounted O-ring to seal said piston in said recess and an internally mounted O-ring to seal said tube in said sleeve when said tube is inserted through said sleeve piston, said piston further having an internal camming recess which tapers radially outwardly in a direction toward said open end of said recess,
(d) a wedge lock sleeve tapered radially inwardly at one end generally complementary to and in axial alignment with said outwardly tapered recess of said piston so as to be receivable within the tapered recess of said piston and cammed radially inwardly thereby into locking engagement with said tube when said tube is inserted through said wedge lock sleeve, said wedge sleeve further having a spherical surface at the other end of said wedge sleeve complental to said spherical surface on said retainer means so as to allow for limited swiveling movement of said tube, said piston and said wedge lock sleeve when said tube is inserted through said wedge lock sleeve and said piston, and
(e) further locking means in said recess to lock said tube in said fitting comprising a locking ring arranged and disposed in said recess so that said tube can be inserted in a first direction through said ring and said ring locks on said tube and first stop means in said main body recess to engage said ring to inhibit withdrawal of said ring and said tube when said tube is urged in a direction opposite to said first direction.

* * * * *